Apr. 24, 1923.
J. F. BRINDLEY
1,452,825
CLOTH PILING MACHINE
Filed Feb. 21, 1922
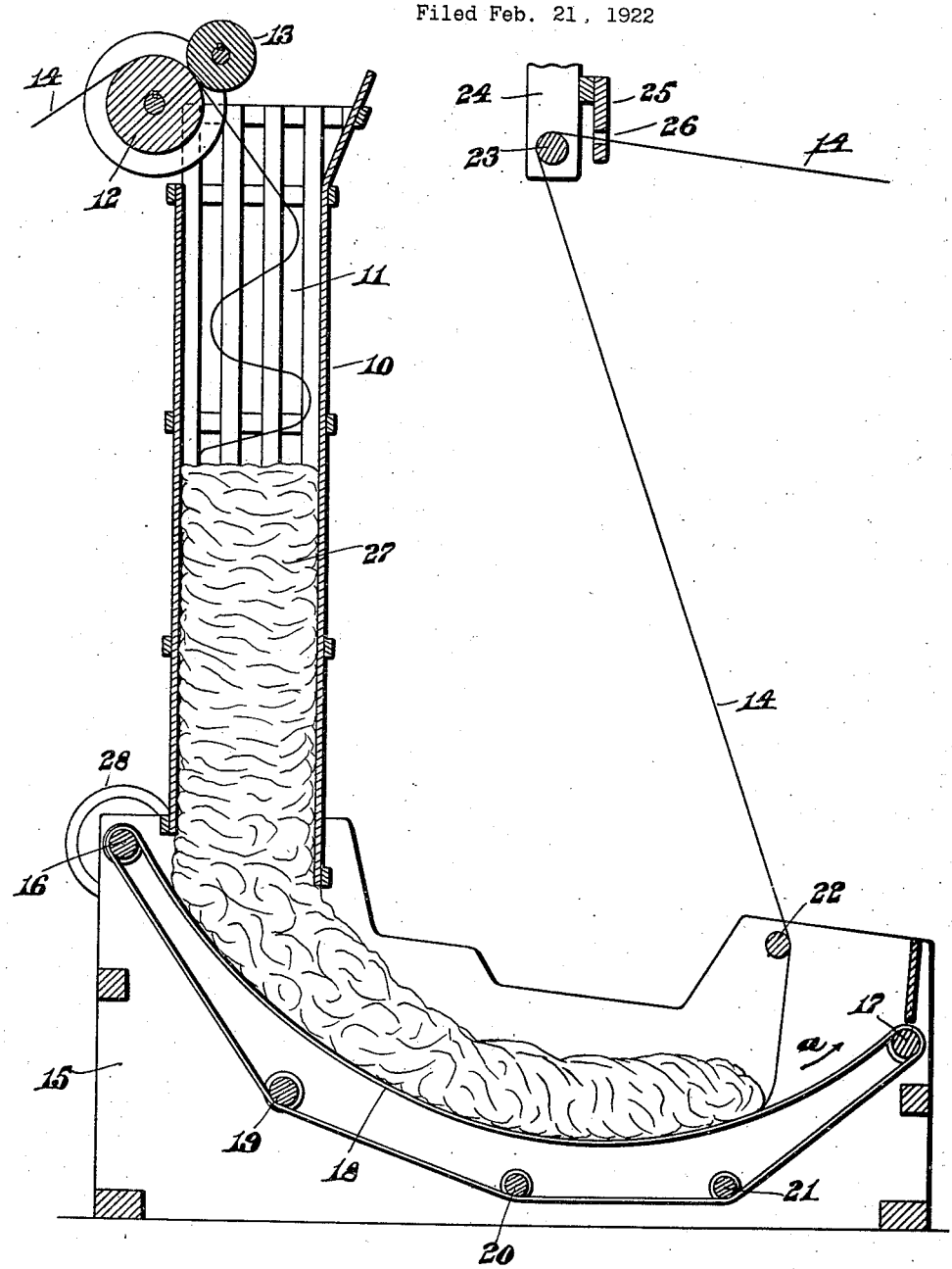
Inventor
Joseph F. Brindley,
by Walter E. Lombard,
Atty.

Patented Apr. 24, 1923.

1,452,825

UNITED STATES PATENT OFFICE.

JOSEPH F. BRINDLEY, OF EAST DEDHAM, MASSACHUSETTS, ASSIGNOR TO HODGES FINISHING COMPANY, OF EAST DEDHAM, MASSACHUSETTS, A CORPORATION OF MASSACHUSETTS.

CLOTH-PILING MACHINE.

Application filed February 21, 1922. Serial No. 538,395.

*To all whom it may concern:*

Be it known that I, JOSEPH F. BRINDLEY, a citizen of the United States of America, and a resident of East Dedham, in the county of Norfolk and State of Massachusetts, have invented certain new and useful Improvements in Cloth-Piling Machines, of which the following is a specification.

This invention relates to machines for conveying cloth from one machine such as a "squeezer" to another machine such as a "washer", and has for its object the piling of the cloth upon an endless belt which will operate automatically under the weight of the cloth, to feed the cloth toward the "washer" or other machine to which it is to be delivered.

The invention consists of an endless belt mounted on rollers between which the upper part of the belt is adapted to sag and support the cloth fed thereto at one end from a delivery hopper, this end of the belt conveyor being considerably higher than the opposite end.

The invention further consists of certain novel features of construction and arrangement of parts which will be understood readily by reference to the description of the drawings, and to the claims to be hereinafter given.

For the purpose of illustrating the invention, one preferred form thereof is shown in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings:

The figure represents a vertical section of a machine embodying the principles of the present invention.

In the drawings 10 is a vertical hopper having a plurality of slots therein. At the upper end of the hopper are feed rollers 12 and 13, which are adapted to feed cloth 14 into said hopper. The lower end of the hopper 10 is open as indicated in the drawing.

Beneath the hopper 10 is a framework 15 having mounted therein the flanged rollers 16 and 17. The roller 16 is considerably higher than the roller 17. On these rollers 16 and 17 is mounted an endless conveyor belt 18, preferably of rubber. The upper portion of the conveyor belt 18 is adapted to sag between the rollers 16 and 17 as indicated in the drawing.

Between the rollers 16 and 17 are a plurality of intermediate rollers 19, 20, and 21, these rollers 19, 20 and 21 being disposed above the lower portion of the belt 18 and free from contact with the upper portion of said belt as clearly illustrated in the drawing.

The purpose of these lower intermediate rollers 19, 20, and 21 is to keep the lower portion of the conveyor belt taut between the rollers 16 and 17 so that the upper portion of said belt will support the cloth delivered to the upper surface of said conveyor belt.

Owing to the roller 16 being considerably higher than the roller 17, the upper portion of the conveyor belt adjacent to the roller 16 will have considerable inclination.

The hopper 10 is positioned adjacent to the roller 16 so that the cloth contained therein is delivered to the conveyor belt 18 where it has the greatest inclination.

Above the conveyor belt 18 and adjacent to the roller 17 is a rod 22 from which the cloth 14 is adapted to pass to a cylindrical stationary member 23 suspended in a bracket 24 to which is secured a slotted guide plate 25 through the slot 26 on which the cloth 14 is adapted to pass to another machine to which it is to be delivered.

Ordinarily the cloth delivered to the feeding rollers 12 and 13 comes from a machine called the "squeezer" and is finally delivered, after passing through the slot 26, to a machine called the "washer." It is obvious, however, that the same conveying mechanism may be used to convey the cloth from some other type of machine to a machine other than a washing machine.

The machine to which the cloth is finally delivered is provided with some form of feeding mechanism which forms no part of the present invention and therefore is not illustrated.

This feeding mechanism is adapted to feed at a speed substantially the same as the speed of the feed rollers 12 and 13 so that a constant supply of the cloth 14 will be in the hopper 10 at all times, it being understood that the cloth is not connected to the feeding mechanism of the machine to which it is to be delivered until a desired supply of cloth has accumulated in the hopper.

The main object of the present invention is to provide some means whereby the bulk of the cloth will be retained in the hopper 10 until it is required to be delivered to the washer or other machine to which it is to be delivered, thereby retaining the cloth in the acid for a longer time than would be the case if it was delivered directly from one machine to the other.

The inclination of the highest part of the upper portion of the conveyor belt is such that it will support a considerable amount of cloth in the hopper 10 without actuating the conveyor belt, but when the weight of the cloth accumulated in the hopper exceeds a predetermined amount, this weight acting upon the inclined portion of the rubber conveyor belt, will cause the belt to move in the direction of the arrow a. As soon as a limited amount of the cloth has been delivered from the hopper, the weight of the cloth still retained in the hopper will decrease to such an extent as to prevent further movement of the conveyor belt. The weight of the cloth on the conveyor belt will cause the upper portion to sag as indicated in the drawing, and the greater the weight on this sagged portion of the conveyor belt, the more taut will be the lower portion of the conveyor belt, as it is forced into contact with the intermediate rollers 19, 20, and 21.

The conveyor belt is so supported upon the various rollers 16, 17, 19, 20, and 21 that the upper portion between the rollers 16 and 17 will never come into contact with the intermediate rollers 19, 20, and 21 no matter how much weight is supported on the sagged upper portion.

In case there is at any time a jam of the cloth in the hopper the conveyor belt may be manually operated by actuating a hand wheel 28, secured to the roller 16, and if necessary, the cloth may be pushed down by a member inserted through one of the vertical slots 11.

In practice, the rollers 16 to 21 inclusive are all mounted in suitable bearings capable of adjustment, but as these bearings and adjusting members may be of any well-known construction, it is deemed unnecessary to illustrate the same in the drawing.

This makes a very simple construction of feeding mechanism for transferring cloth from one machine driven at one speed to another machine driven at the same speed, and where it is desired to retain the cloth in its acid for a longer time than would be the case if it was delivered directly from one machine to the other.

It is believed that the operation and many advantages of the invention will be readily understood without further description.

Having thus described my invention, I claim:

1. A long frame work having vertical side walls and provided with parallel rollers at opposite ends, one of which is higher than the other; an endless one-piece conveyor belt on these rollers between which the upper portion is adapted to sag; intermediate rollers above the lower portion of the belt and free from contact with the upper portion of said belt; and a hopper above said conveyor with its lower end between said side walls and near the highest roller adapted to deliver cloth to a steeply inclined part of the conveyor, and thereby, by the weight of the cloth, cause the portion of the belt beneath said hopper to move downwardly with the cloth thereon for a considerable distance beyond said hopper and toward the delivery end of the frame work.

2. A long frame work provided with parallel rollers at opposite ends, one of which is higher than the other; an endless one-piece conveyor belt on these rollers between which the upper portion is adapted to sag with its lowest point near the delivery end of said frame work; intermediate rollers above the lower portion of the belt and free from contact with the upper portion of said belt; a hopper above the receiving end of said conveyor and near the highest roller adapted to deliver cloth to a steeply inclined part of the conveyor and thereby, by the weight of the cloth, cause the portion of the belt beneath said hopper to move downwardly with the cloth thereon, toward the delivery end of said frame work; and an emergency hand wheel for rotating one of said rollers.

3. A frame work provided with parallel rollers at opposite ends, one of which is higher than the other; an endless conveyor belt on these rollers between which the upper portion of the belt is adapted to sag with its lowest point relatively much nearer the lower roller than the higher roller; intermediate rollers above the lower portion of the belt and against which said lower portion is forced into frictional contact by the weight of the material deposited upon the upper sagging portion; and a hopper above said conveyor belt with its delivery end adjacent the higher roller and considerably removed from the lowest point of the upper sagging portion whereby the material in said hopper will be delivered upon a steeply inclined part of the upper portion of said belt and thereby cause it, with the material thereon, to be moved toward the delivery end of said frame work until the weight of the material being deposited upon the belt is reduced beyond a predetermined limit.

4. A frame work provided with parallel rollers at opposite ends, one of which is higher than the other; an endless conveyor belt on these rollers between which the upper portion is adapted to sag; intermediate rollers above the lower portion of the belt and free from contact with the upper portion of said belt; a hopper above said conveyor and near the highest roller adapted to deliver cloth to a steeply inclined part of the conveyor; cloth feeding rollers at the upper end of said hopper; a roll above the lower end of said framework to receive the treated material; and a member adjacent said roll provided with a slot through which the material is adapted to be delivered.

5. A frame work having vertical side walls provided with alined bearings; parallel rollers mounted in said bearings; an endless belt supported by the two end rollers, one of which is slightly higher than the other, with the lower portion of said belt bearing against the under side of the intermediate rollers, which intermediate rollers are separated from the sagging upper portion of said belt; a hopper positioned above said frame work with its lower end extending a short distance downwardly between said side walls, and adjacent to the highest end roller; feeding mechanism at the upper end of said hopper; a fixed guide rod mounted in the side walls between and parallel to the end rollers and adjacent to the lower end roller; a roll supported above the lower part of said belt and over which passes the material from the conveyor belt moving over said guide rod; and a member adjacent said roll having a horizontal slot through which the treated material is delivered.

Signed by me at 746 Old South Bldg., Boston, Mass., this 20th day of February, 1922.

JOSEPH F. BRINDLEY.

Witnesses:
WALTER E. LOMBARD,
NATHAN C. LOMBARD.